US009800772B2

(12) United States Patent
Miyatani et al.

(10) Patent No.: US 9,800,772 B2
(45) Date of Patent: Oct. 24, 2017

(54) FOCUS ADJUSTMENT DEVICE AND FOCUS ADJUSTMENT METHOD THAT DETECTS SPATIAL FREQUENCY OF A CAPTURED IMAGE

(71) Applicant: Sony Corporation, Minato-ku (JP)

(72) Inventors: Yoshitaka Miyatani, Tokyo (JP); Norihiko Akamatsu, Tokyo (JP); Genta Yagyu, Kanagawa (JP)

(73) Assignee: SONY CORPORTAION, Tokyo (JP)

( * ) Notice: Subject to any disclaimer, the term of this patent is extended or adjusted under 35 U.S.C. 154(b) by 0 days.

(21) Appl. No.: 13/911,186

(22) Filed: Jun. 6, 2013

(65) Prior Publication Data
US 2014/0036134 A1    Feb. 6, 2014

(30) Foreign Application Priority Data
Jul. 31, 2012  (JP) ................................ 2012-169130

(51) Int. Cl.
*H04N 5/232*  (2006.01)

(52) U.S. Cl.
CPC ......... *H04N 5/23212* (2013.01); *H04N 5/232* (2013.01)

(58) Field of Classification Search
CPC ........................... H04N 5/23212; H04N 5/232

USPC .......................................................... 348/345
See application file for complete search history.

(56) References Cited

U.S. PATENT DOCUMENTS

| | | | | |
|---|---|---|---|---|
| 2008/0309771 A1* | 12/2008 | Takahashi | ................... | 348/208.4 |
| 2012/0274837 A1* | 11/2012 | Yamasaki | ....................... | 348/360 |
| 2012/0300104 A1* | 11/2012 | Onuki et al. | ................... | 348/302 |
| 2014/0022441 A1* | 1/2014 | Jenkin | ................ | H04N 5/23212 |
| | | | | 348/349 |

FOREIGN PATENT DOCUMENTS

JP    2012215700 A    * 11/2012

OTHER PUBLICATIONS

U.S. Appl. No. 13/908,183, filed Jun. 3, 2013, Miyatani, et al.

* cited by examiner

*Primary Examiner* — Antoinette Spinks
(74) *Attorney, Agent, or Firm* — Chip Law Group

(57) ABSTRACT

There is provided a focus adjustment device including an image sensor including a plurality of phase difference detection pixels that each perform pupil division of a photographing lens, a correction value acquisition unit for acquiring a correction value for a focus position in a spatial frequency of a subject which is obtained by the image sensor, and a focus adjustment unit for adjusting a focus position of the photographing lens based on the correction value acquired by the correction value acquisition unit.

8 Claims, 13 Drawing Sheets

FIG. 2

FIG. 4
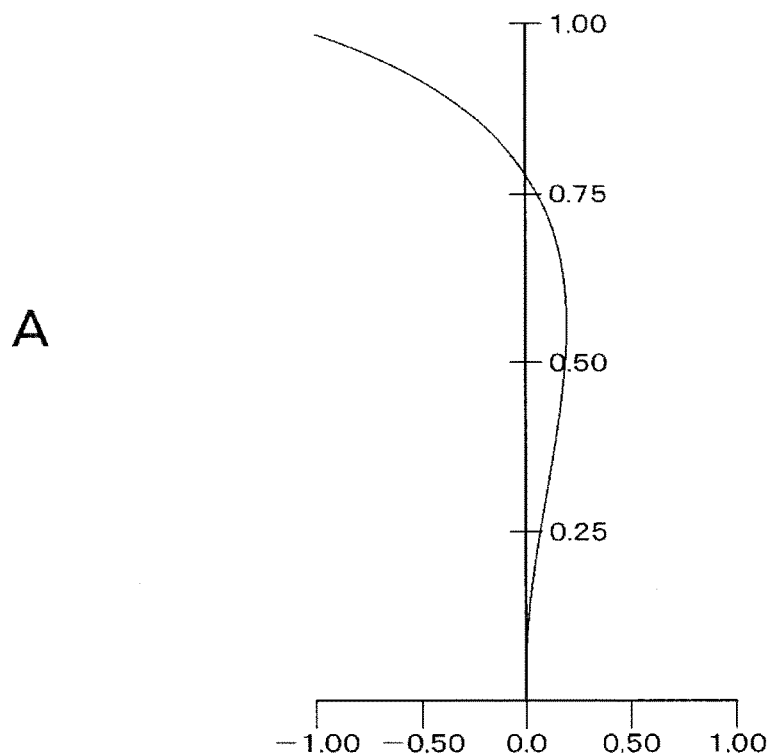
A
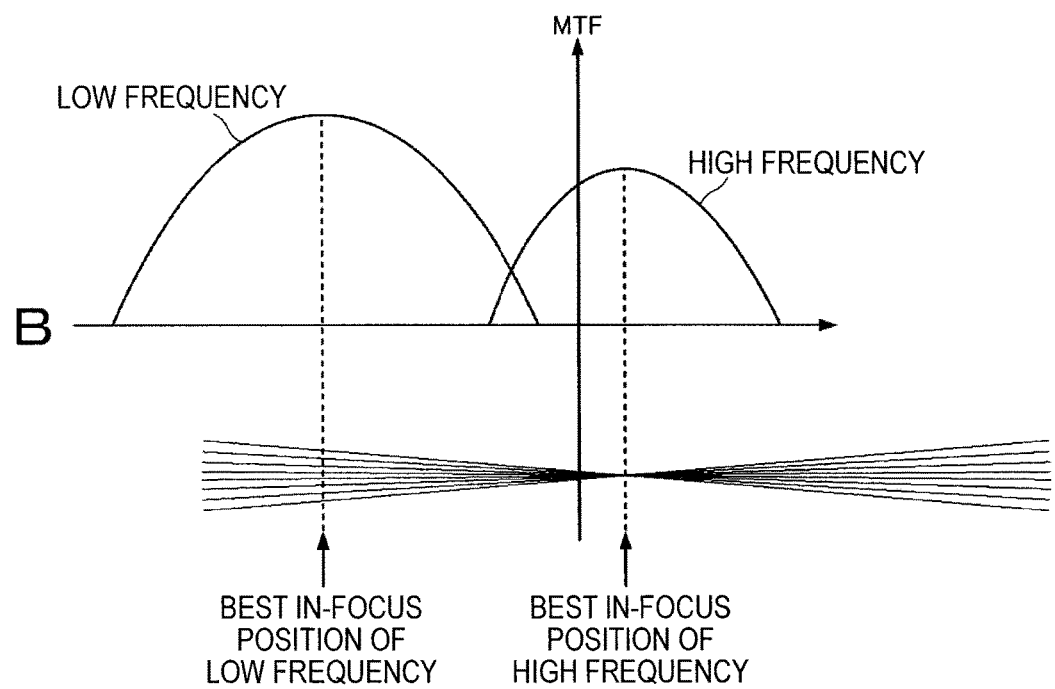
B

FIG. 5
A
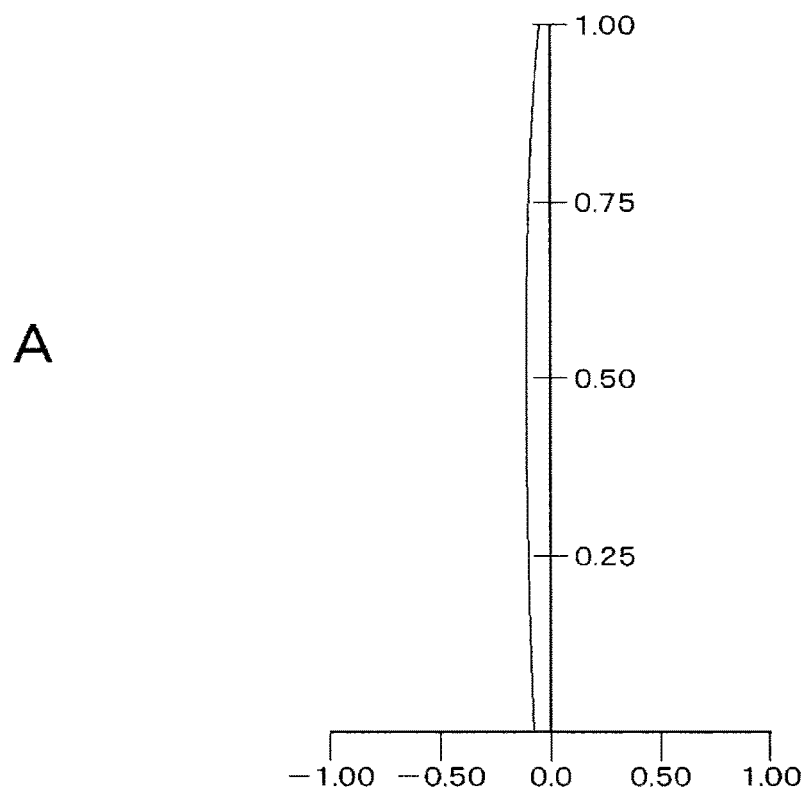
B
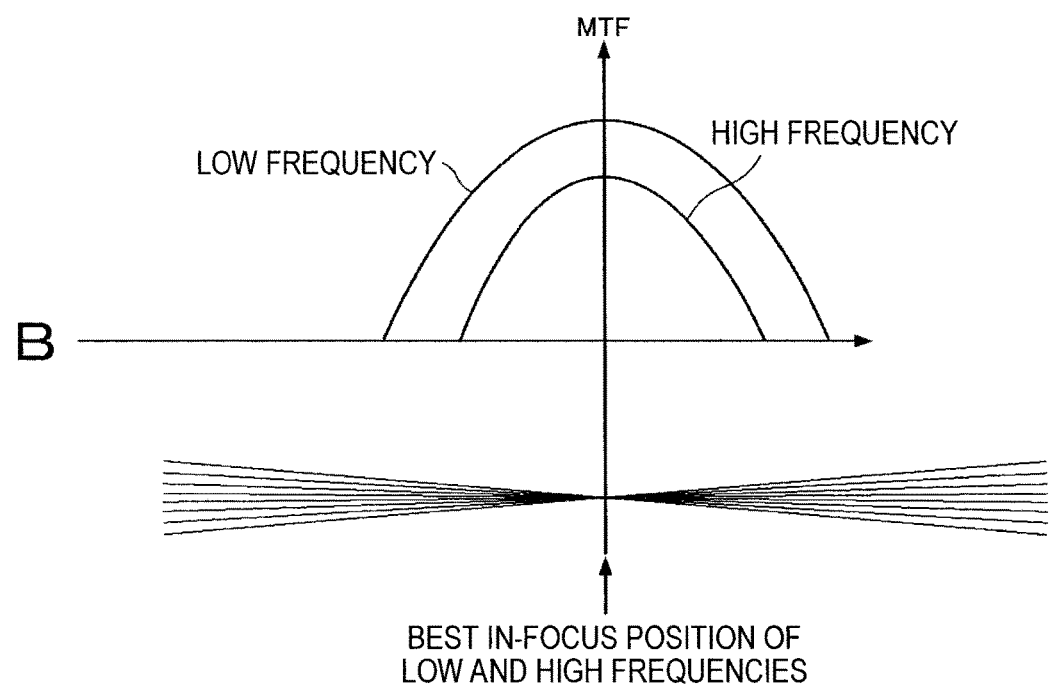
BEST IN-FOCUS POSITION OF
LOW AND HIGH FREQUENCIES

FOCUS ADJUSTMENT DEVICE AND FOCUS ADJUSTMENT METHOD THAT DETECTS SPATIAL FREQUENCY OF A CAPTURED IMAGE

BACKGROUND

The present technology relates to a focus adjustment device and a focus adjustment method.

Recently, a method of implementing a fast auto focus (AF) by embedding pixels used for detecting the phase difference into an image sensor has been widely used in an image pickup apparatus. However, there is a problem that a portion in which a phase difference detection pixel is embedded in image sensors is treated as a defective pixel, which leads to degradation of image quality. Therefore, there has been proposed a technique for calculating an output of a phase difference detection pixel using information from neighboring pixels of the phase difference detection pixel, thereby preventing degradation of image quality (see Japanese Unexamined Patent Application Publication No. 2009-44637).

SUMMARY

However, even when the technique for preventing deterioration of image quality to some extent is applied, the phase difference detection pixels are typically arranged in a discrete manner in the image sensor. Thus, it is difficult to detect adequate signals from a subject with a high spatial frequency, and a focus position detected by the phase difference detection pixel is different from the best image plane position in a photographing lens, resulting in an out of focus image.

An embodiment of the present technology has been made in view of the above problem, and thus there is provided a focus adjustment device and focus adjustment method capable of being in focus with high accuracy even when a focus position of a photographing lens is different from the best image plane position due to a spatial frequency.

According to a first embodiment of the present disclosure, there is provided a focus adjustment device including an image sensor including a plurality of phase difference detection pixels that each perform pupil division of a photographing lens, a correction value acquisition unit for acquiring a correction value for a focus position in a spatial frequency of a subject which is obtained by the image sensor, and a focus adjustment unit for adjusting a focus position of the photographing lens based on the correction value acquired by the correction value acquisition unit.

According to a second embodiment of the present disclosure, there is provided a focus adjustment device including an image sensor including a plurality of phase difference detection pixels that each perform pupil division of a photographing lens, a correction value determination unit for determining whether a correction value for a focus position in a spatial frequency of a subject which is obtained by the image sensor is greater than or equal to a predetermined value, a correction value acquisition unit for acquiring the correction value when it is determined by the correction value determination unit that the correction value is greater than or equal to the predetermined value, and a focus adjustment unit for adjusting a focus position of the photographing lens based on the correction value acquired by the correction value acquisition unit.

According to a third embodiment of the present disclosure, there is provided a focus adjustment method implemented by an image pickup apparatus including an image sensor including a plurality of phase difference detection pixels that perform pupil division of a photographing lens, the method including acquiring a correction value for a focus position in a spatial frequency of a subject which is obtained by the image sensor, and adjusting a focus position of the photographing lens based on the correction value.

According to a fourth embodiment of the present disclosure, there is provided a focus adjustment method implemented by an image pickup apparatus including an image sensor including a plurality of phase difference detection pixels that perform pupil division of a photographing lens, the method including determining whether a correction value for a focus position in a spatial frequency of a subject which is obtained by the image sensor is greater than or equal to a predetermined value, acquiring the correction value when it is determined that the correction value is greater than or equal to the predetermined value, and adjusting a focus position of the photographing lens based on the correction value.

According to the embodiments of the present technology, it is possible to get in focus with high accuracy even when a focus position of the photographing lens is different from the best image plane position due to a spatial frequency.

BRIEF DESCRIPTION OF THE DRAWINGS

FIG. 2 is a diagram illustrating the configuration of an image sensor;

FIG. 4A is a diagram illustrating spherical aberration characteristics;

FIG. 4B is a diagram illustrating an in-focus position and light rays in the vicinity of the in-focus position for each of a subject with a high spatial frequency and a subject with a low spatial frequency in the case that spherical aberration is large;

FIG. 5A is a diagram illustrating spherical aberration characteristics;

FIG. 5B is a diagram illustrating an in-focus position and light rays in the vicinity of the in-focus position for each of a subject with a high spatial frequency and a subject with a low spatial frequency in the case that spherical aberration is small;

DETAILED DESCRIPTION OF THE EMBODIMENT(S)

Figure 1:
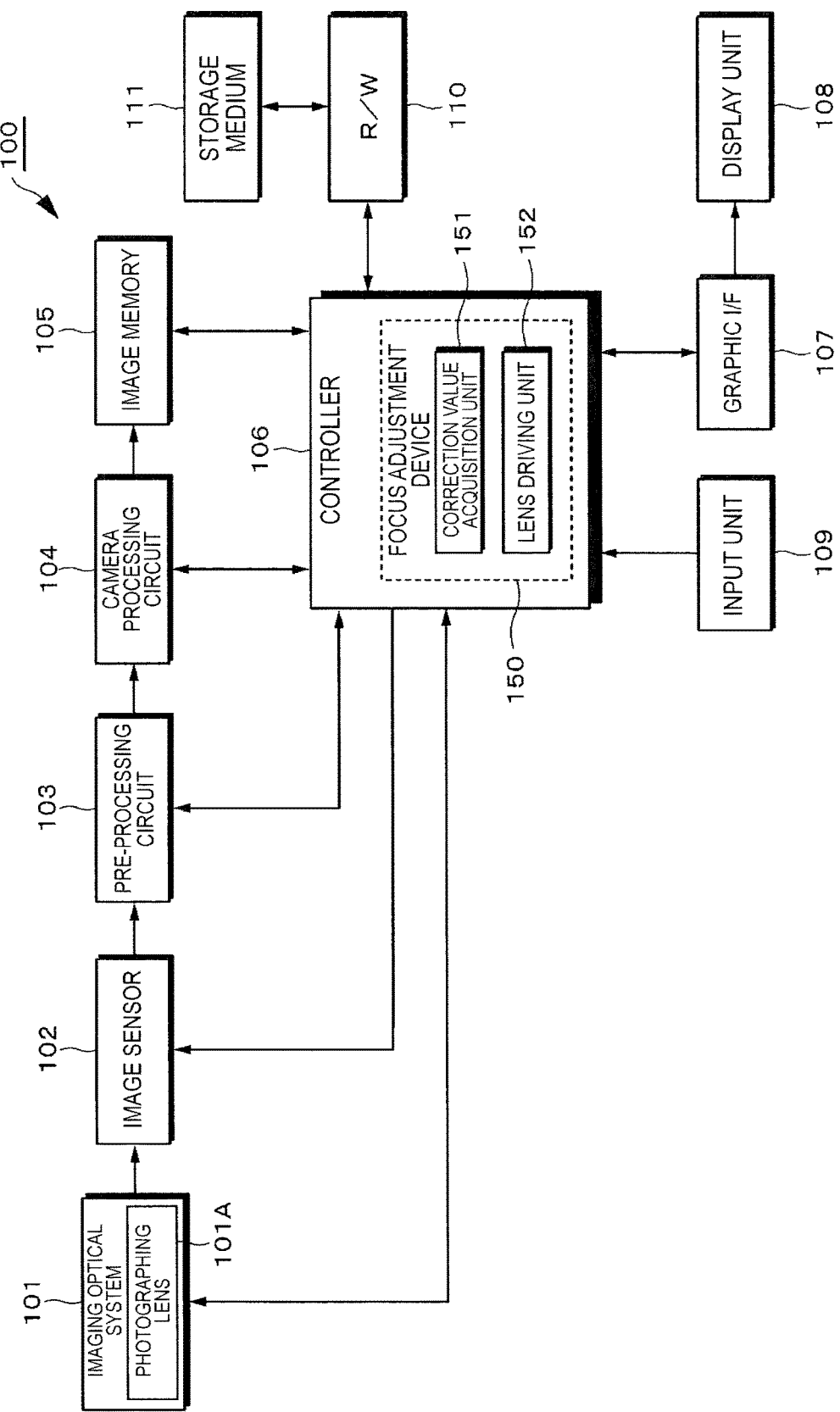
FIG. 1 is a block diagram illustrating the configuration of a focus adjustment device and an image pickup apparatus according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<1. First Embodiment>
[1-1. Configuration of Focus Adjustment Device and Image Pickup Apparatus]
[1-2. Focus Adjustment Process]
<1. Second Embodiment>
[2-1. Configuration of Focus Adjustment Device and Image Pickup Apparatus]
[2-2. Focus Adjustment Process]
<3. Third Embodiment>
[3-1. Configuration of Focus Adjustment Device and Image Pickup Apparatus]
[3-2. Focus Adjustment Process]
<4. Fourth Embodiment>
[4-1. Configuration of Focus Adjustment Device and Image Pickup Apparatus]
[4-2. Focus Adjustment Process]
<5. Modified Example>
<1. First Embodiment>
[1-1. Configuration of Focus Adjustment Device and Image Pickup Apparatus]

A configuration of an image pickup apparatus 100 according to an embodiment of the present technology will be described. FIG. 1 is a block diagram illustrating an overall configuration of the image pickup apparatus 100.

The image pickup apparatus 100 is configured to include an imaging optical system 101, an image sensor 102, a pre-processing circuit 103, a camera processing circuit 104, an image memory 105, a controller 106, a graphic interface (I/F) 107, a display unit 108, an input unit 109, a reader/writer (R/W) 110, and a storage medium 111. The controller 106 functions as a focus adjustment device 150.

The imaging optical system 101 is configured to include a photographing lens 101A, a driving mechanism, a shutter mechanism, an iris mechanism, and so on.

The photographing lens 101A is used to concentrate light from a subject on the image sensor 102. The driving mechanism moves the photographing lens 101A to perform focusing or zooming. These components in the imaging optical system 101 are driven based on a control signal from the controller 106 and a lens driving unit 152. An optical image of a subject obtained through the imaging optical system 101 is imaged on the image sensor 102 which serves as an image pickup device.

The image sensor 102 includes red (R), green (G) and blue (B) pixels which are normal imaging pixels, and a phase difference detection pixel which is used to detect a phase difference. Each pixel that constitutes the image sensor 102 photoelectrically converts an incident light from a subject into electrical charges, thereby outputting a pixel signal. The image sensor 102 finally outputs an imaging signal which is composed of pixel signals to the pre-processing circuit 103. The image sensor 102 may be a charge coupled device (CCD), a complementary metal oxide semiconductor (CMOS), or the like. In addition, a more detailed configuration of the image sensor 102 will be described later.

The pre-processing circuit 103 performs a sample-and-hold process or the like on the imaging signal outputted from the image sensor 102 so as to maintain a good signal-to-noise (SN) ratio using a correlated double sampling (CDS) process. Furthermore, the pre-processing circuit 13 controls a gain using an auto gain control (AGC) process and performs an analog-to-digital (A/D) conversion to output digital image signals.

The camera processing circuit 104 performs a signal process, such as a white balance adjustment process or color correction process, a gamma correction process, Y/C conversion process, and an auto exposure (AE) process, on the image signal provided from the pre-processing circuit 103.

The image memory 105 is a buffer memory which is composed of a volatile memory, for example, a dynamic random access memory (DRAM), and temporarily stores image data obtained by performing the predetermined process in the pre-processing circuit 103 and the camera processing circuit 104.

The controller 106 is configured to include, for example, a CPU, a RAM, and a ROM. The ROM stores a program or the like to be read and executed by the CPU. The RAM is used as a work memory of the CPU. The CPU executes various processes according to the program stored in the ROM and issues commands to control the entire image pickup apparatus 100.

Furthermore, the controller 106 functions as the focus adjustment device 150 by executing a predetermined program. In this regard, the focus adjustment device 150 may be implemented not only as a program but also as a dedicated device by hardware which functions as the focus adjustment device. In the latter case, the image pickup apparatus 100 is configured to include the focus adjustment device as the hardware.

The focus adjustment device 150 includes a correction value acquisition unit 151 and a lens driving unit 152. The correction value acquisition unit 151 is adapted to acquire a correction value necessary for focus adjustment to be performed in the lens driving unit 152. The correction value acquisition unit 151 obtains lens information to acquire a correction value. This lens information includes zoom (focal length), focus (photographing distance), and aperture (f-number) in the photographing lens 101A of the image optical system 101. For example, these values may be obtained from a microcomputer or the like (not shown) which controls the photographing lens 101A. The correction value acquisition unit 151 also acquires a spatial frequency based on a phase difference signal from an image sensor with phase difference detection pixels. Alternatively, the correction value acquisition unit 151 may obtain a sensor image height of the phase difference detection pixel to acquire a correction value.

The correction value acquisition unit 151 acquires a correction value by referring to a correction value table based on the lens information, spatial frequency, and image height. The correction value table includes a correction value which is associated with the lens information, spatial frequency, and image height. The correction value table may be previously stored in a ROM of the controller 106 which functions as the focus adjustment device 150, or may be stored in a separate storage medium. When the focus adjustment device is implemented as hardware, the correction value table may be stored in a storage medium inside the hardware. Correction values in the correction value table may be discrete values, or may be obtained by interpolation calculation from values in the correction value table.

The correction value is previously defined in the correction value table as a value obtained based on a spatial frequency determined depending on the density of phase difference detection pixels in the image sensor 102, a sensor image height of the phase difference detection pixel, and the lens information. The correction value is a difference value between a focus position obtained by the image sensor and the best image plane position in the photographing lens 101A, and is defined as the amount of shift of the photographing lens 101A with respect to an optical axis direction.

The lens driving unit 152 is adapted to transmit a predetermined control signal to a photographing lens 101A of the imaging optical system 101 for causing the photographing lens 101A to be driven, based on the correction value acquired by the correction value acquisition unit 151, and thus adjust a focus position of the photographing lens 101A. The lens driving unit 152 corresponds to the focus adjustment unit recited in the claims.

The graphic I/F 107 generates an image signal to be displayed on the display unit 108 from the image signal supplied from the controller 106, supplies the image signal to the display unit 108, and then allows the display unit 108 to display an image. The display unit 108 is a display means which includes, for example, a liquid crystal display (LCD), a plasma display panel (PDP), and an organic electro luminescence (EL) panel. The display unit 108 may display a through image which is currently being captured, an image recorded in the storage medium 111, or the like.

The input unit 109 is configured to include, for example, a power button for power on/off switching, a release button for instructing the start of recording a captured image, an operator for adjusting zoom, a touch screen formed integrally with the display unit 108, or the like. If an operation is inputted through the input unit 109, then a control signal corresponding to the inputted operation is generated and the generated control signal is outputted to the controller 106. The controller 106 then performs an operation processing or controlling in response to the control signal.

The R/W 110 is an interface which is connected with the storage medium 111 for storing image data or the like generated by capturing an image. The R/W 110 writes data which is supplied from the controller 106 to the storage medium 111 and outputs data which is read from the storage medium 111 to the controller 106.

The storage medium 111 may be a mass storage medium such as a hard disk, a memory stick (registered trademark of Sony Corporation), and a SD memory card. Image may be stored in a compressed state based on standards such as JPEG. Exchangeable image file format (EXIF) data including additional information such as information about the stored image and the captured date and time of the image is also stored in the storage medium 111 in association with the image.

A basic operation in the image pickup apparatus 100 described above will now be described. Before capturing an image, incident light is received and photoelectrically converted in the image sensor 102, and then the converted signals are sequentially supplied to the pre-processing circuit 103. The pre-processing circuit 103 performs a CDS process, an AGC process, or the like on the signal supplied from the image sensor 102 and converts the signal into an image signal.

The camera processing circuit 104 performs an image quality correction process on the image signal supplied from the pre-processing circuit 103 and supplies the processed signal as a camera through image to the graphic I/F 107 via the controller 106. In this way, the camera through image is displayed on the display unit 108. A user can adjust the angle of view while viewing the through image displayed on the display unit 108.

In this condition, when a shutter button on the input unit 109 is pressed, the controller 106 outputs a control signal to the imaging optical system 101 so as to cause a shutter constituting the imaging optical system 101 to be activated. This allows image signals for one frame to be outputted from the image sensor 102.

The camera processing circuit 104 performs the image quality correction process on the image signals for one frame supplied from the image sensor 102 via the pre-processing circuit 103, and supplies the processed image signal to the controller 106. The controller 106 compresses and encodes the image signal inputted from the camera processing circuit, and supplies the generated encoded data to the R/W 110. As a result, a data file of the captured still image is stored in the storage medium 111.

On the other hand, when the image file stored in the storage medium 111 is played back, the controller 106 reads the selected still image file from the storage medium 111 via the R/W 110 according to an operation input from the input unit 109. The decompression and decoding process is performed on the read image file. The decoded image signal is supplied to the graphic I/F 107 via the controller 106. As a result, the still image stored in the storage medium 111 is displayed on the display unit 108.

Figure 2:
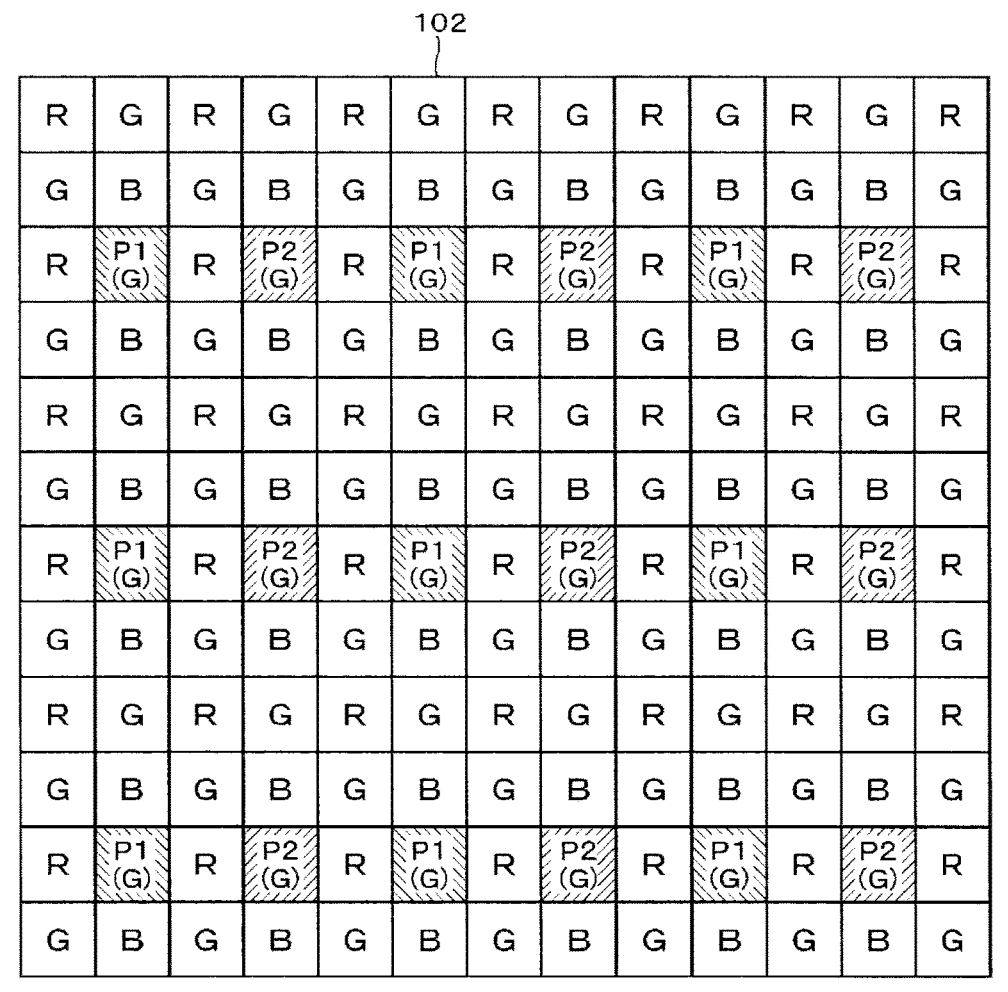

Next, a configuration of the image sensor 102 will now be described. FIG. 2 is a diagram illustrating an array of normal pixels and phase difference detection pixels in the image sensor 102. In FIG. 2, R indicates red (R) pixels, G indicates green (G) pixels, and B indicates blue (B) pixels, which are normal imaging pixels.

In FIG. 2, P1 indicates a first phase difference detection pixel, and P2 indicates a second phase difference detection pixel. The phase difference detection pixel is configured as a pair of P1 and P2, and performs pupil division of the photographing lens 101A. The phase difference detection pixels P1 and P2 have optical characteristics different from those of normal imaging pixels. In addition, in FIG. 2, G pixel is set as a phase difference detection pixel. This is because there are two times as many G pixels as there are R and B pixels. However, the phase difference detection pixel is not limited to G pixel.

The image sensor 102 includes phase difference detection pixels in addition to normal pixels. Thus, the image pickup apparatus 100 can perform so-called image plane phase difference AF (auto focus) by an output from the phase difference detection pixel.

Figure 3:
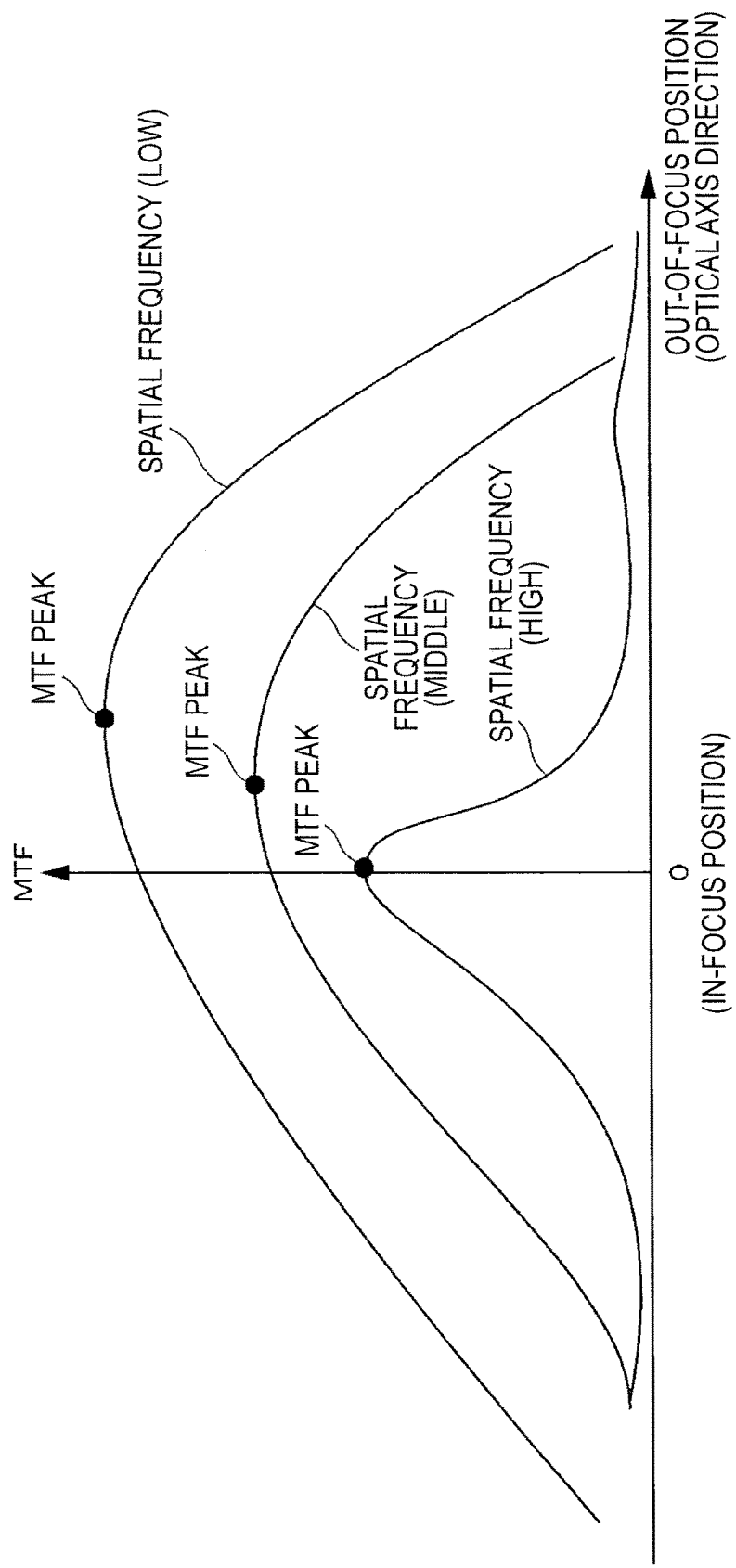
FIG. 3 is a diagram for explaining an example of the relationship between a focus position of each spatial frequency of a photographing lens and a modulation transfer function (MTF) of a subject image.

Next, an example of the relationship between a focus position of each spatial frequency of a photographing lens and a modulation transfer function (MTF) of a subject image will be described with reference to FIG. 3. In FIG. 3, the horizontal axis indicates an out-of-focus position in an optical axis direction, and the center of the horizontal axis indicates an in-focus position. The vertical axis indicates MTF. In FIG. 3, three spatial frequencies are indicated as an example of the spatial frequency, and three line segments, respectively, indicate a high spatial frequency, a low spatial frequency, and a middle spatial frequency.

The MTF is defined as the ratio of the contrast of an image formed through an optical system to the contrast of a subject, and indicates to what extent the contrast of a subject can be faithfully reproduced as spatial frequency characteristics. The MTF is used as one of indicators for evaluating the photographing lens performance.

As can be seen from FIG. 3, MTF peaks are shifted from the in-focus position, as the spatial frequency becomes lower. Thus, in the condition that the photographing lens is arranged as described above, for a subject image with a low spatial frequency, a focus position detected by the phase difference detection pixel is different from the best image plane position of the photographing lens. If photographing is performed in this condition, the image being out of focus will be obtained. In addition, the spatial frequencies of a subject shown in FIG. 3 are illustrative only.

Next, spherical aberration and an in-focus position will be described with reference to FIGS. 4A to 5B. FIG. 4A illustrates an example in a case of large spherical aberration in a view showing spherical aberration characteristics. In addition, FIG. 4B is a diagram illustrating an in-focus position and light rays in the vicinity of the in-focus position for each of a subject with a high spatial frequency and a subject with a low spatial frequency in the case that spherical aberration is large.

The spherical aberration means a phenomenon that an angle of incidence of light to the photographing lens is changed depending on the distance from an optical axis when light is concentrated by the photographing lens, and light does not converge to a point on the optical axis, because a lens surface of the photographing lens is a spherical surface.

In the case that spherical aberration is large as shown in FIG. 4A, there is a difference between the best in-focus positions of the subject with a high spatial frequency and the subject with a low spatial frequency, and also any one of both positions does not coincide with MTF, as shown in FIG. 4B. In other words, a difference occurs in the MTF peaks of the spatial frequencies due to spherical aberration of the photographing lens. When an image is acquired by performing a photographing in this condition, a blurred image which is out of focus will be obtained.

FIG. 5A illustrates an example of a case where spherical aberration is small in a view showing spherical aberration characteristics. In addition, FIG. 5B is a diagram illustrating an in-focus position and light rays in the vicinity of the in-focus position for each of a subject with a high spatial frequency and a subject with a low spatial frequency in the case that the spherical aberration is small.

In a case where spherical aberration is small as shown in FIG. 5A, there is little difference between the best in-focus positions of the subject with a high spatial frequency and the subject with a low spatial frequency, and their MTF peaks are close to the best in-focus position, as shown in FIG. 5B. When photographing is performed in this condition, an image which is exactly in focus can be obtained.

Therefore, the embodiment of the present technology is intended to cause the photographing lens 101A to be driven so that the MTF peaks of spatial frequencies are matched even when there is a difference between the MTF peaks of the subject with a high spatial frequency and the subject with a low spatial frequency as shown in FIG. 4.

Figure 6:
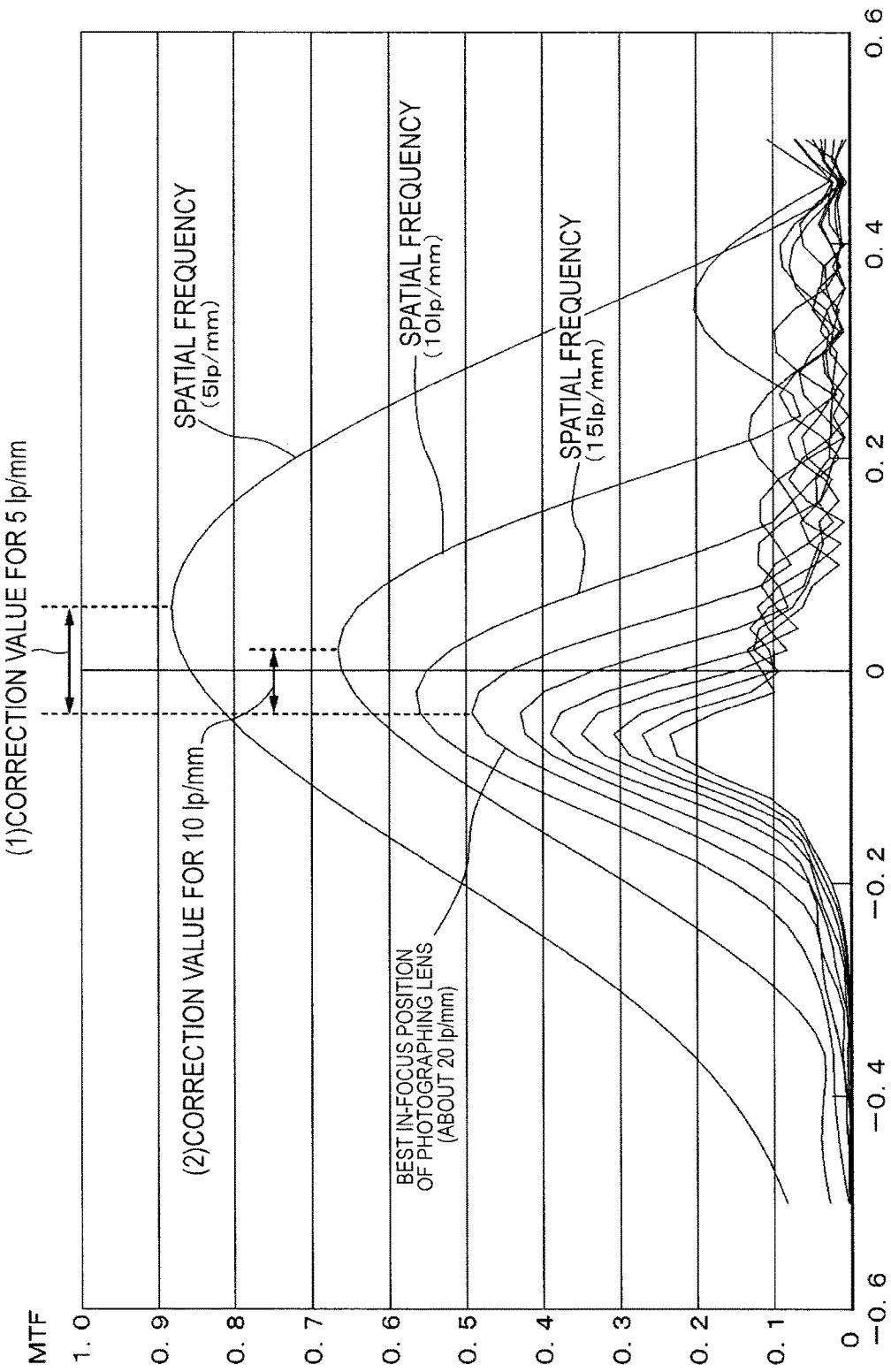
FIG. 6 is a diagram for explaining a correction value by way of an example of a plurality of spatial frequencies.

FIG. 6 is a diagram for explaining a correction value by way of an example of a plurality of spatial frequencies. In a case where the best in-focus position of the photographing lens is, for example, a spatial frequency of about 20 lp/mm, there is a difference between a MTF peak of the spatial frequency (5 lp/mm) in FIG. 6 and a MTF peak of the spatial frequency (about 20 lp/mm) which is the best in-focus position. Thus, in order to eliminate the difference, for the spatial frequency (5 lp/mm), as shown in (1) of FIG. 6, the difference between the MTF peak of the spatial frequency (5 lp/mm) and the MTF peak of the spatial frequency (about 20 lp/mm) may be set as a correction value. This is because the spatial frequency being detected by the phase difference detection pixel disposed in a discrete manner is 5 lp/mm.

If the phase difference detection pixels are embedded more densely into the image sensor 102, then the spatial frequency becomes, for example, 10 lp/mm. For the spatial frequency (10 lp/mm), as shown in (2) of FIG. 6, the difference between the MTF peak of the spatial frequency (10 lp/mm) and the MTF peak of the spatial frequency (about 20 lp/mm) may be set as a correction value. In addition, the spatial frequencies of 5 lp/mm and 10 lp/mm are only illustrative values for convenience of description.

The correction values defined in this way are included in the correction value table.

[1-2. Focus Adjustment Process]

Figure 7:
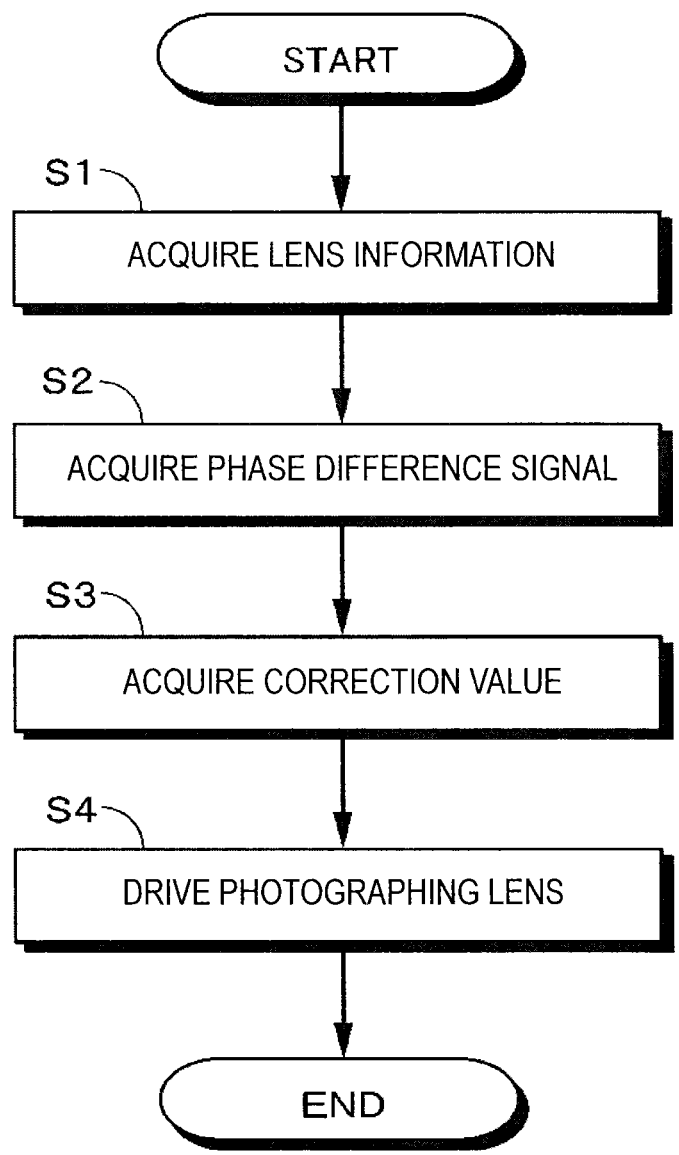
FIG. 7 is a flowchart showing a flow of a focus adjustment process according to the first embodiment.

Next, a focus adjustment process to be performed in the image pickup apparatus 100 provided with the focus adjustment device 150 described above will be described. FIG. 7 is a flowchart showing a flow of the focus adjustment process. This focus adjustment process starts, for example, when a user performs an input to the shutter button of the image pickup apparatus 100.

In step S1, the correction value acquisition unit 151 acquires lens information which is information about the photographing lens 101 A from the imaging optical system 101. This lens information includes zoom (focal length), focus (photographing distance), and aperture (f-number). In step S2, the correction value acquisition unit 151 acquires a phase difference signal from the image sensor 102 having phase difference detection pixels.

In step S3, the correction value acquisition unit 151 acquires a correction value. The correction value is acquired by referring to the correction value table based on the lens information obtained in step S1, the spatial frequency obtained from the phase difference signal acquired in step S2, and an image height.

In step S4, the lens driving unit 152 drives the photographing lens 101A of the image optical system 101 based on the correction value acquired by the correction value acquisition unit 151. Specifically, the photographing lens 101A is driven back and forth by the value indicated by the correction value. Thus, even when a focus position of the photographing lens is shifted due to the spatial frequency, both of the subject with a high spatial frequency and the subject with a low spatial frequency are in-focus. In other words, even in the condition where a focus position of the lens is shifted due to the spatial frequency, it is possible to adjust the focus with enhanced precision. Photographing performed in this condition allows the image being in focus to be obtained.

<2. Second Embodiment>

[2-1. Configuration of Focus Adjustment Device and Image Pickup Apparatus]

Next, a description of a second embodiment of the present technology will now be given. The second embodiment is different from the first embodiment in that a focus adjustment device further includes a correction value determination unit 251 which is used to determine whether a correction value satisfies a predetermined condition. The other configurations are similar to those of the first embodiment, and thus descriptions thereof are omitted.

Figure 8:
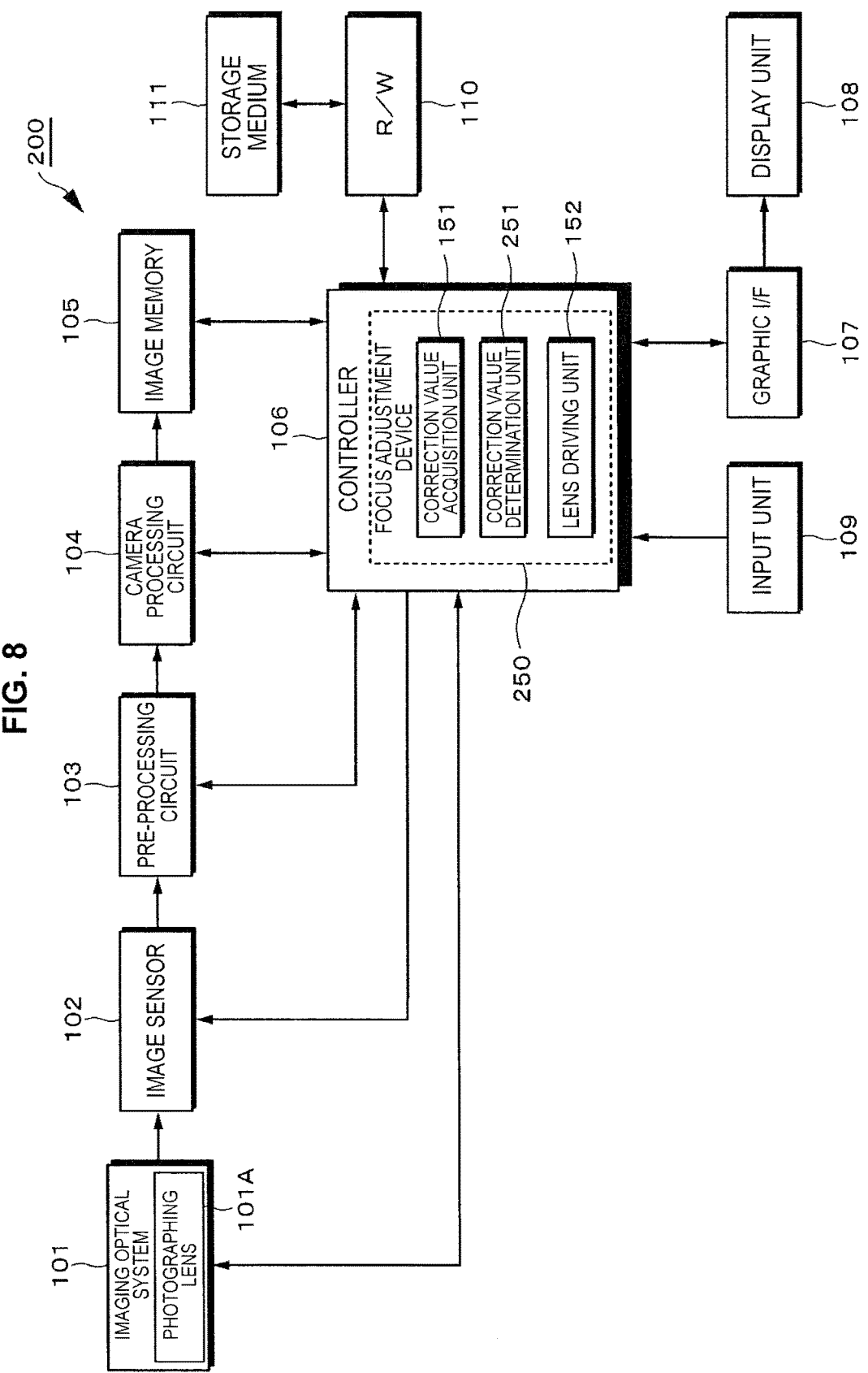
FIG. 8 is a block diagram illustrating the configuration of a focus adjustment device and an image pickup apparatus according to a second embodiment of the present technology.

FIG. 8 is a block diagram illustrating the configuration of the focus adjustment device 250 and an image pickup apparatus 200 according to the second embodiment. In the second embodiment, the focus adjustment device 250 includes the correction value determination unit 251. The correction value determination unit 251 determines whether the correction value acquired by the correction value acquisition unit 151 is greater than or equal to a predetermined threshold value. If it is determined that the correction value is greater than or equal to the predetermined threshold value, then the correction value acquisition unit 151 acquires the correction value and supplies the acquired correction value to the lens driving unit 152. The lens driving unit 152 adjusts the focus by driving the lens based on the correction value. On the other hand, if it is determined that the correction value is smaller than the predetermined threshold value, then the correction value acquisition unit 151 does not acquire a correction value. In this case, since the correction value acquisition unit 151 does not acquire a correction value, the lens driving unit 152 also does not adjust the focus.

The threshold value to be compared with the correction value may be, for example, a small value such as a few micrometers. Therefore, since the focus adjustment may not be performed when the correction value is a small value which is not necessary to perform the focus adjustment, it is possible to achieve reduction in processing load, high speed processing, and so on.

[2-2. Focus Adjustment Process]

Figure 9:
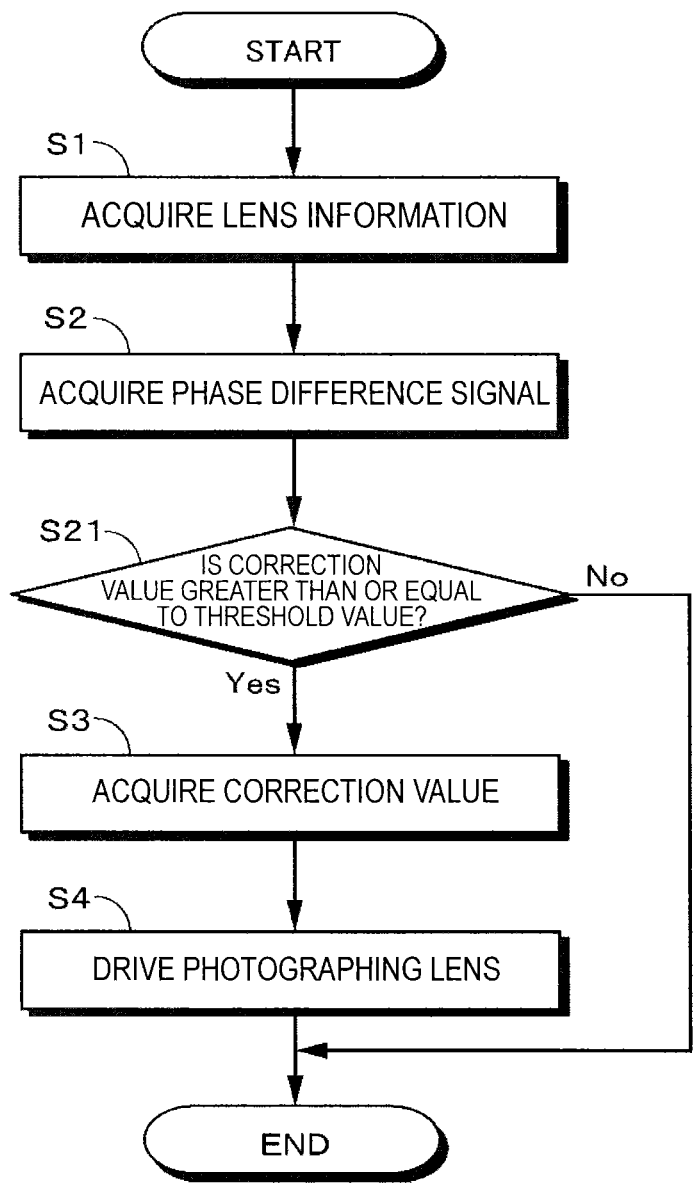
FIG. 9 is a flowchart showing a flow of a focus adjustment process according to the second embodiment.

Next, a description of a process according to the second embodiment will be given. FIG. 9 is a flowchart showing a flow of the process according to the second embodiment. Steps S1 to S4 are substantially similar to those of the first embodiment, and thus descriptions thereof are omitted.

In step S2, after the correction value acquisition unit 151 acquires a phase difference signal, the correction value determination unit 251, in step S21, makes a determination by comparing a correction value to a predetermined threshold value by referring to the correction value table based on lens information, a spatial frequency obtained from the phase difference detection pixel, and an image height.

If it is determined that the correction value is greater than or equal to the threshold value, in step S3, the correction value acquisition unit 151 acquires the correction value, and, in step S4, the lens driving unit drives the lens, thereby performing the focus adjustment (Yes in step S21).

On the other hand, if it is determined that the correction value is smaller than the threshold value, since there is not necessary to perform the focus adjustment, the flow is ended without performing the processes of steps S3 and S4 (No in step S21).

In the above description, the correction value acquisition unit 151 acquires the correction value after the correction value determination unit 251 makes a determination by comparing the correction value to the threshold value. However, the correction value determination unit 251 may determine whether the correction value acquired by the correction value acquisition unit 151 is greater than or equal to the threshold value after the correction value acquisition unit 151 acquires the correction value. If the correction value is greater than or equal to the threshold value, then the correction value determination unit 251 may issue an instruction for causing the lens driving unit 152 to perform the focus adjustment. If the correction value is smaller than the threshold value, then the correction value determination unit 251 may issue an instruction for causing the lens driving unit 152 not to perform the focus adjustment. With such a process, it is also possible to achieve results similar to ones obtained from the flowchart in FIG. 9.

<3. Third Embodiment>

[3-1. Configuration of Focus Adjustment Device and Image Pickup Apparatus]

Next, a third embodiment of the present technology will be described. The third embodiment is different from the first and second embodiments in that a focus adjustment device 350 includes a defocus amount calculation unit 351 which performs correction of defocus. The other configurations are similar to those of the first embodiment, and thus descriptions thereof are omitted.

Figure 10:
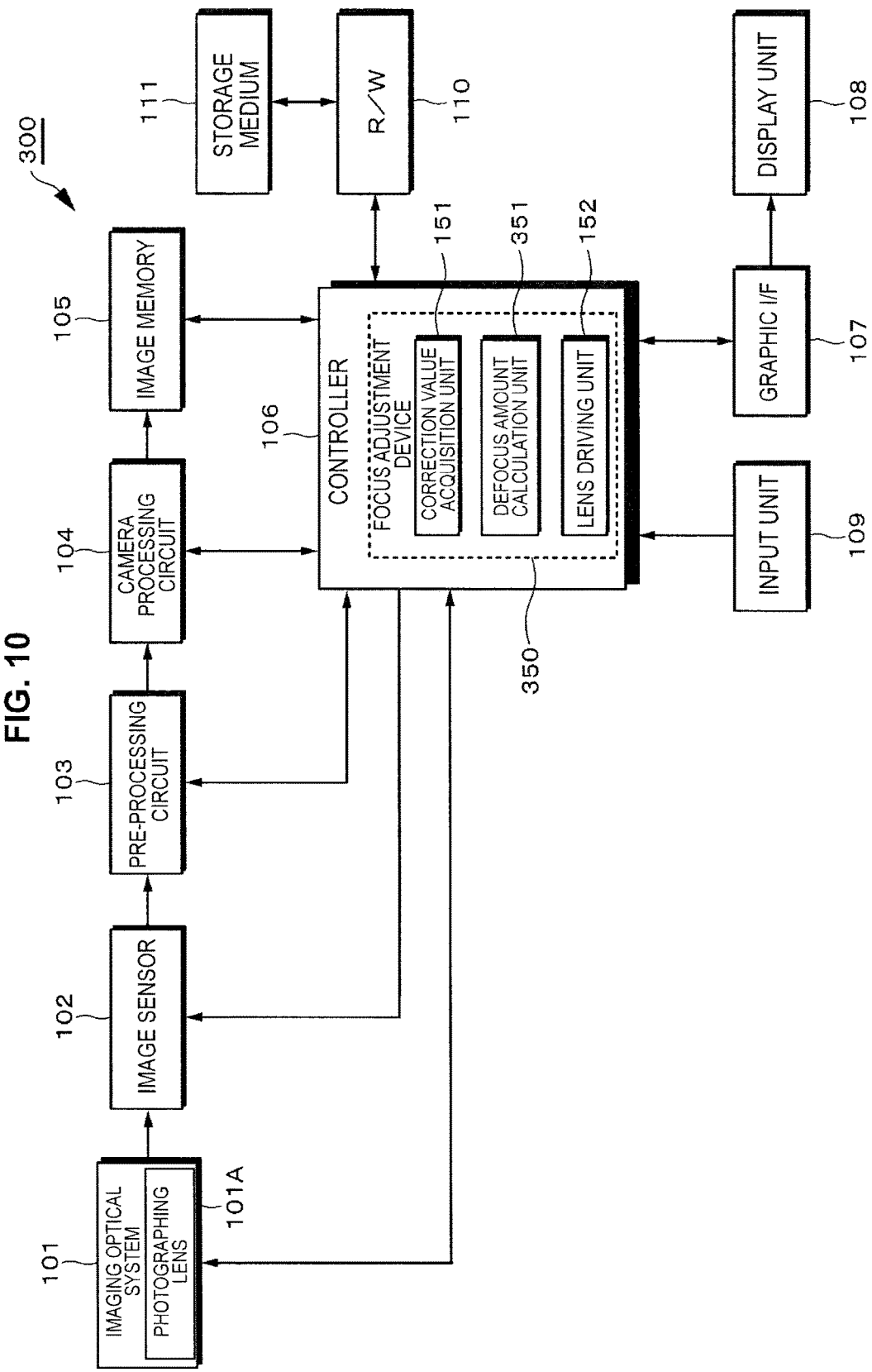
FIG. 10 is a block diagram illustrating the configuration of a focus adjustment device and an image pickup apparatus according to a third embodiment of the present technology.

FIG. 10 is a block diagram illustrating the configuration of the focus adjustment device 350 and an image pickup apparatus 300 according to the third embodiment. The focus adjustment device 350 includes the defocus amount calculation unit 351 in addition to the correction value acquisition unit 151 and the lens driving unit 152. The defocus amount calculation unit 351 calculates a defocus amount which represents a focus status of the photographing lens 101A from the phase difference signal. The defocus amount calculation unit 351 then outputs the calculated defocus amount to the lens driving unit 152.

[3-2. Focus Adjustment Process]

Figure 11:
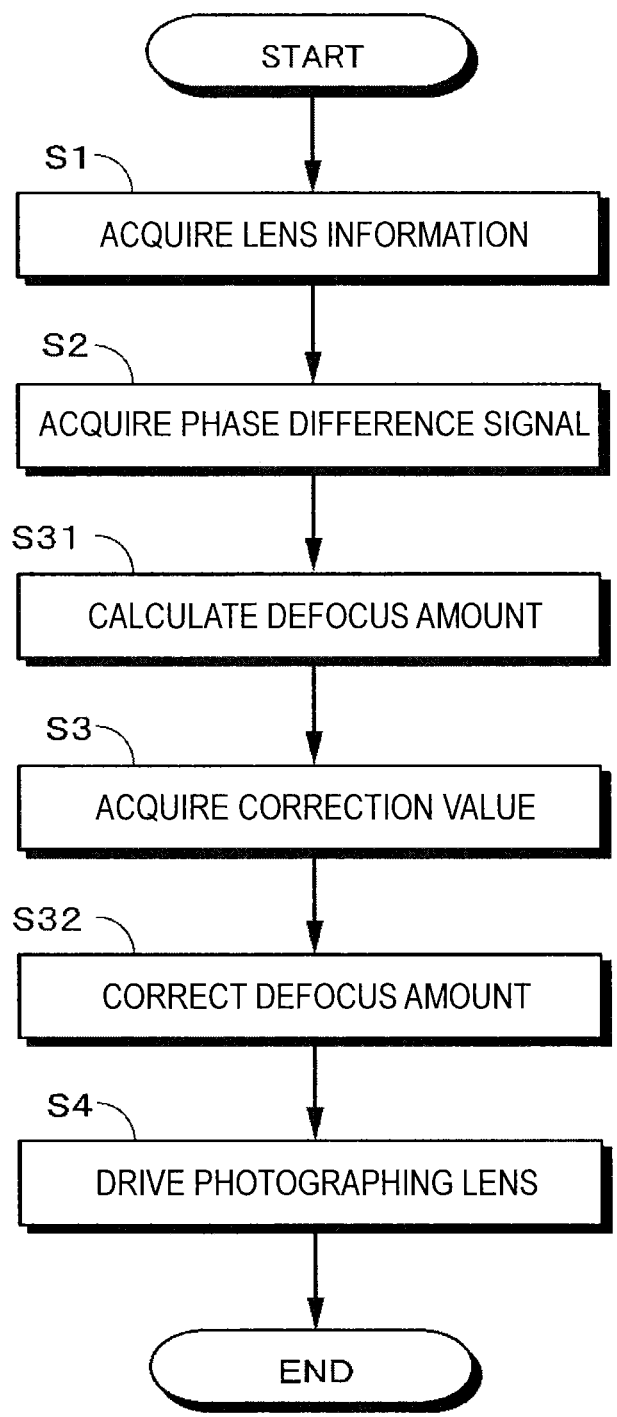
FIG. 11 is a flowchart showing a flow of a focus adjustment process according to the third embodiment.

Next, a process according to the third embodiment will be described. FIG. 11 is a flowchart showing a flow of the process according to the third embodiment. Steps S1 to S4 are substantially similar to those of the first embodiment, and thus descriptions thereof are omitted.

In step S2, if a phase difference signal is obtained by an image sensor having phase difference detection pixels, then, in step S31, the defocus amount calculation unit 351 calculates a defocus amount from the phase difference signal. In step S32, defocus is corrected based on the defocus amount.

Similar to the first embodiment, in step S4, the photographing lens 101A is driven by the lens driving unit 152, thereby performing the focus adjustment process.

According to the third embodiment, since defocus is corrected in addition to the focus adjustment performed by driving the lens based on the correction value, it is possible to adjust focus with higher accuracy.

<4. Fourth Embodiment>

[4-1. Configuration of Focus Adjustment Device and Image Pickup Apparatus]

Next, a fourth embodiment of the present technology will be described. The fourth embodiment is different from the first to third embodiments in that a focus adjustment device 450 includes a defocus amount calculation unit 451 for calculating a defocus amount and a correction value determination unit 452 for determining whether a correction value satisfies a predetermined condition.

Figure 12:
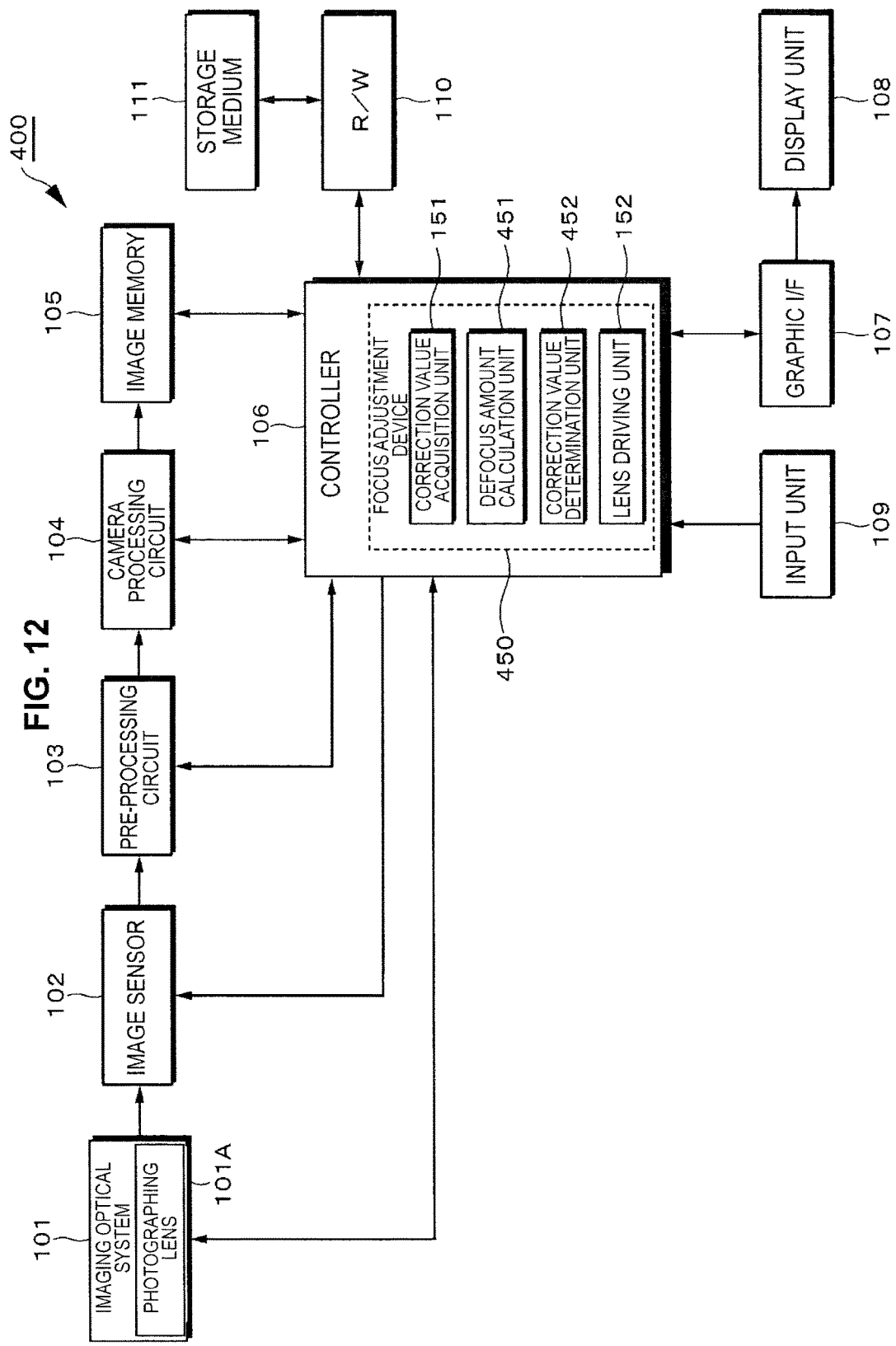
FIG. 12 is a block diagram illustrating the configuration of a focus adjustment device and an image pickup apparatus according to a fourth embodiment of the present technology.

FIG. 12 is a block diagram illustrating the configuration of the focus adjustment device 450 and an image pickup apparatus 400 according to the fourth embodiment. The focus adjustment device 450 includes the defocus amount calculation unit 451 and the correction value determination unit 452, in addition to the correction value acquisition unit 151 and the lens driving unit 152.

The defocus amount calculation unit 451 is similar to the defocus amount calculation unit according to the third embodiment. In addition, the correction value determination unit 452 is similar to the correction value determination unit according to the second embodiment. The threshold value to be compared with the correction value may be, for example, a small value such as a few micrometers. The other configurations of the focus adjustment device 450 and the image pickup apparatus 400 are similar to those of the first embodiment.

[4-2. Focus Adjustment Process]

Figure 13:
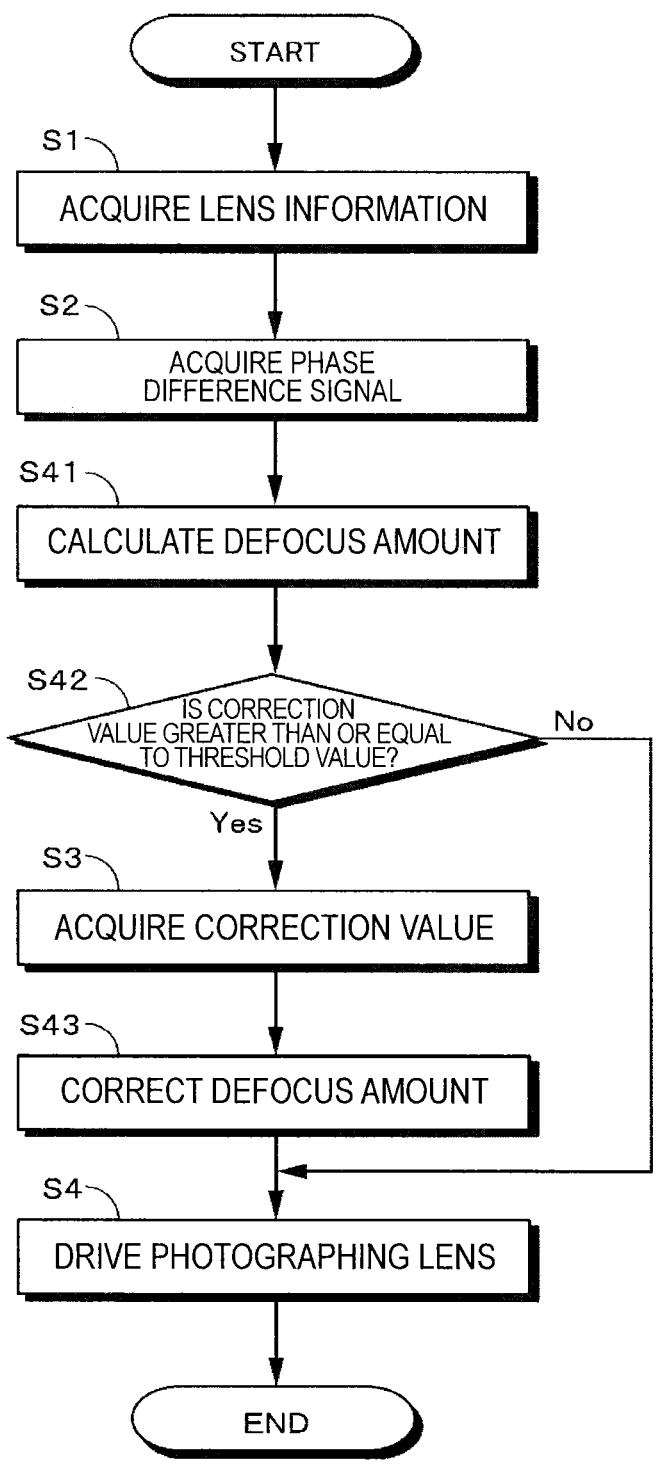
FIG. 13 is a flowchart showing a flow of a focus adjustment process according to the fourth embodiment.

Next, a process according to the fourth embodiment will be described. FIG. 13 is a flowchart showing a flow of the process according to the fourth embodiment. Steps S1 to S4 are substantially similar to those of the first embodiment, and thus detailed descriptions thereof are omitted.

In step S2, if a phase difference signal is obtained by an image sensor 102 having phase difference detection pixels, then, in step S41, the defocus amount calculation unit 451 calculates a defocus amount from the phase difference signal.

Subsequently, in step S42, the correction value determination unit 452 makes a determination by comparing the correction value to a predetermined threshold value by referring to the correction value table based on lens information, the spatial frequency obtained from the phase difference signal, and an image height.

If it is determined that the correction value is greater than or equal to the threshold value, then, in step S3, the correction value acquisition unit 151 acquires a correction value, and, in step S43, defocus is corrected based on the defocus amount calculated in step S41 described above (Yes in step S42).

In step S4, the lens driving unit 152 drives the photographing lens 101A, thereby performing the focus adjustment.

On the other hand, if it is determined that the correction value is smaller than the threshold value, since there is not necessary to perform the correction value acquisition or defocus correction, the flow proceeds to step S4 (No in step S42). In step S4, the lens driving unit 152 drives the photographing lens based on only a defocus amount which is not corrected.

The process according to the fourth embodiment is performed as described above. According to the fourth embodiment, since the defocus is corrected in addition to the focus adjustment performed by driving the lens based on the correction value, it is possible to adjust focus with higher accuracy. Moreover, since the focus adjustment may not be performed when the correction value is a small value which is not necessary to perform the focus adjustment, it is possible to achieve reduction in processing load, high speed processing, and so on.

<5. Modified Example>

It should be understood by those skilled in the art that various modifications, combinations, sub-combinations and alterations may occur depending on design requirements and other factors insofar as they are within the scope of the appended claims or the equivalents thereof. The present technology may also have the following configurations.

(1) A focus adjustment device including:

an image sensor including a plurality of phase difference detection pixels that each perform pupil division of a photographing lens;

a correction value acquisition unit for acquiring a correction value for a focus position in a spatial frequency of a subject which is obtained by the image sensor; and a focus adjustment unit for adjusting a focus position of the photographing lens based on the correction value acquired by the correction value acquisition unit.

(2) The focus adjustment device according to (1), wherein the correction value is a difference between the focus position in the spatial frequency of the subject which is obtained by the image sensor and a best image plane position in the photographing lens.

(3) The focus adjustment device according to (1) or (2), wherein the correction value is a value corresponding to information about the photographing lens.

(4) The focus adjustment device according to (3), wherein the information about the photographing lens includes a focal length, photographing distance, and f-number of the photographing lens.

(5) The focus adjustment device according to any one of (1) to (4), wherein the correction value acquisition unit acquires the correction value by referring to a correction value table that holds the correction value in advance based on the spatial frequency.

(6) The focus adjustment device according to (5), wherein the correction value acquisition unit further acquires the correction value by referring to a correction value table that holds the correction value in advance based on information about the photographing lens.

(7) A focus adjustment device including:

an image sensor including a plurality of phase difference detection pixels that each perform pupil division of a photographing lens;

a correction value determination unit for determining whether a correction value for a focus position in a spatial frequency of a subject which is obtained by the image sensor is greater than or equal to a predetermined value;

a correction value acquisition unit for acquiring the correction value when it is determined by the correction value determination unit that the correction value is greater than or equal to the predetermined value; and a focus adjustment unit for adjusting a focus position of the photographing lens based on the correction value acquired by the correction value acquisition unit.

(8) A focus adjustment method implemented by an image pickup apparatus including an image sensor including a plurality of phase difference detection pixels that perform pupil division of a photographing lens, the method including:

acquiring a correction value for a focus position in a spatial frequency of a subject which is obtained by the image sensor; and adjusting a focus position of the photographing lens based on the correction value.

(9) A focus adjustment method implemented by an image pickup apparatus including an image sensor including a plurality of phase difference detection pixels that perform pupil division of a photographing lens, the method including:

determining whether a correction value for a focus position in a spatial frequency of a subject which is obtained by the image sensor is greater than or equal to a predetermined value;

acquiring the correction value when it is determined that the correction value is greater than or equal to the predetermined value; and adjusting a focus position of the photographing lens based on the correction value.

(10) A focus adjustment program for causing a computer to execute a focus adjustment method implemented by an image pickup apparatus including an image sensor including a plurality of phase difference detection pixels that perform pupil division of a photographing lens, the method including:

acquiring a correction value for a focus position in a spatial frequency of a subject which is obtained by the image sensor; and adjusting a focus position of the photographing lens based on the correction value.

(11) A focus adjustment program for causing a computer to execute a focus adjustment method implemented by an image pickup apparatus including an image sensor including a plurality of phase difference detection pixels that perform pupil division of a photographing lens, the method including:

determining whether a correction value for a focus position in a spatial frequency of a subject which is obtained by the image sensor is greater than or equal to a predetermined value;

acquiring the correction value when it is determined that the correction value is greater than or equal to the predetermined value; and adjusting a focus position of the photographing lens based on the correction value.

(12) An image pickup device including:

an image sensor including a plurality of phase difference detection pixels that each perform pupil division of a photographing lens;

a correction value acquisition unit for acquiring a correction value for a focus position in a spatial frequency of a subject which is obtained by the image sensor; and a focus adjustment unit for adjusting a focus position of the photographing lens based on the correction value acquired by the correction value acquisition unit.

(13) An image pickup device including:

an image sensor including a plurality of phase difference detection pixels that each perform pupil division of a photographing lens;

a correction value determination unit for determining whether a correction value for a focus position in a spatial frequency of a subject which is obtained by the image sensor is greater than or equal to a predetermined value;

a correction value acquisition unit for acquiring the correction value when it is determined by the correction value determination unit that the correction value is greater than or equal to the predetermined value; and a focus adjustment unit for adjusting a focus position of the photographing lens based on the correction value acquired by the correction value acquisition unit.

The present disclosure contains subject matter related to that disclosed in Japanese Priority Patent Application JP 2012-169130 filed in the Japan Patent Office on Jul. 31, 2012, the entire content of which is hereby incorporated by reference.

What is claimed is:

1. A focus adjustment device, comprising:
an image sensor including a plurality of phase difference detection pixels,
wherein each of the plurality of phase difference detection pixels executes pupil division of a photographing lens; and
circuitry configured to:
detect a spatial frequency of a subject based on the plurality of phase difference detection pixels;
determine a spatial frequency that corresponds to a determined in-focus position for the photographing lens;
detect a sensor image height of the subject captured in at least one of the plurality of the phase detection pixels;
determine, by a correction value table, a focus correction value for the photographing lens based on a difference between the detected sensor image height, and peaks of the determined spatial frequency that correspond to both the photographing lens and the detected spatial frequency of the subject; and
control the in-focus position of the photographing lens based on the determined focus correction value,
wherein the determined in-focus position of the photographing lens is a position of the photographing lens where the subject in focus is captured based on the photographing lens.

2. The focus adjustment device according to claim 1, wherein the focus correction value is a value corresponding to information about the photographing lens.

3. The focus adjustment device according to claim 2, wherein the information about the photographing lens includes at least one of a focal length, photographing distance, or f-number of the photographing lens.

4. The focus adjustment device according to claim 1, wherein the circuitry is further configured to acquire the focus correction value based on the correction value table that holds the focus correction value in advance based on the spatial frequency.

5. The focus adjustment device according to claim 1, wherein the circuitry is further configured to acquire the focus correction value based on the correction value table that holds the focus correction value in advance based on information about the photographing lens.

6. A focus adjustment device, comprising:
an image sensor including a plurality of phase difference detection pixels,
wherein each of the plurality of phase difference detection pixels executes pupil division of a photographing lens; and
circuitry configured to:
detect a spatial frequency of a subject based on the plurality of phase difference detection pixels;
determine that a first focus correction value for a focus position corresponding to the detected spatial frequency of the subject is greater than or equal to a threshold value;
determine a spatial frequency that corresponds to a determined in-focus position for the photographing lens;
detect a sensor image height of the subject captured in at least one of the plurality of the phase detection pixels;
determine, by a correction value table, a second focus correction value for the photographing lens based on a difference between the detected sensor image height, and peaks of the determined spatial frequency that correspond to both the photographing lens and the detected spatial frequency of the subject; and
control the in-focus position of the photographing lens based on the determined second focus correction value,
wherein the determined in-focus plane position of the photographing lens is a position of the photographing lens where the subject in-focus is captured based on the photographing lens.

7. A focus adjustment method, comprising:
in an image pickup apparatus that includes an image sensor including a plurality of phase difference detection pixels that execute pupil division of a photographing lens:
detecting a spatial frequency of a subject based on the plurality of phase difference detection pixels;

determining a spatial frequency that corresponds to a determined in-focus position for the photographing lens;

detecting a sensor image height of the subject captured in at least one of the plurality of the phase detection pixels;

determining, by a correction value table, a focus correction value for the photographing lens based on a difference between the detected sensor image height, and peaks of the determined spatial frequency that correspond to both the photographing lens and the detected spatial frequency of the subject; and controlling the in-focus position of the photographing lens based on the determined focus correction value, wherein the determined in-focus plane position of the photographing lens is a position of the photographing lens where the subject in-focus is captured based on the photographing lens.

8. A focus adjustment method, the method comprising:

in an image pickup apparatus that includes an image sensor including a plurality of phase difference detection pixels that execute pupil division of a photographing lens:

detecting a spatial frequency of a subject based on the plurality of phase difference detection pixels;

determining that a first focus correction value for a focus position corresponding to the detected spatial frequency of the subject is greater than or equal to a threshold value;

determining a spatial frequency that corresponds to a determined in-focus position for the photographing lens;

detecting a sensor image height of the subject captured in at least one of the plurality of the phase detection pixels;

determining, by a correction value table, a second focus correction value for the photographing lens based on a difference between the detected sensor image height, and peaks of the determined spatial frequency that correspond to both the photographing lens and the detected spatial frequency of the subject; and controlling the in-focus position of the photographing lens based on the determined second focus correction value, wherein the determined in-focus plane position of the photographing lens is a position of the photographing lens where the subject in-focus is captured based on the photographing lens.

* * * * *